United States Patent
Weng et al.

(10) Patent No.: US 6,701,875 B2
(45) Date of Patent: Mar. 9, 2004

(54) INTERNAL COMBUSTION ENGINE WITH PISTON COOLING SYSTEM AND PISTON THEREFOR

(75) Inventors: Weibo Weng, Columbus, IN (US); Gordon L. Starr, Columbus, IN (US); Guangping Pan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 10/158,137

(22) Filed: May 31, 2002

(65) Prior Publication Data

US 2003/0221639 A1 Dec. 4, 2003

(51) Int. Cl.$^7$ .................................................. F01P 1/04
(52) U.S. Cl. ................................. 123/41.35; 123/193.6
(58) Field of Search .......................... 123/41.35, 193.6; 92/174, 186

(56) References Cited

U.S. PATENT DOCUMENTS

| | | |
|---|---|---|
| 2,967,516 A | 1/1961 | Stümpfig |
| 4,286,505 A | 9/1981 | Amdall |
| 4,377,967 A | 3/1983 | Pelizzoni |
| 4,867,119 A | 9/1989 | Cooper et al. |
| 4,895,111 A | 1/1990 | Elsbett |
| 4,979,473 A | 12/1990 | Lee |
| 5,065,707 A | 11/1991 | Elsbett et al. |
| 5,115,725 A | 5/1992 | Horiuchi |
| 5,261,363 A * | 11/1993 | Kemnitz ................... 123/41.35 |
| 5,595,145 A | 1/1997 | Ozawa |
| 6,250,275 B1 | 6/2001 | Bock et al. |
| 6,298,810 B1 | 10/2001 | Chimonides et al. |
| 6,371,061 B2 * | 4/2002 | Lash ........................ 123/41.35 |

* cited by examiner

Primary Examiner—Noah P. Kamen
(74) Attorney, Agent, or Firm—Nixon Peabody LLP; Tim L. Brackett, Jr.

(57) ABSTRACT

A piston cooling system and associated piston are provided which effectively cools and lubricates the upper crown portion of a piston and the connecting rod/piston pin area using a single cooling nozzle. The piston cooling system includes a piston having a cooling gallery, a cooling nozzle positioned to direct cooling oil through a flow path to the entrance of the cooling gallery, and a deflecting surface positioned in the flow path to deflect a portion of the cooling oil into a deflected flow path toward the connecting rod and piston pin area. The deflecting surface may be formed on a baffle plate positioned as the bottom wall of the cooling gallery or may be integrally formed on the piston body.

12 Claims, 2 Drawing Sheets

INTERNAL COMBUSTION ENGINE WITH PISTON COOLING SYSTEM AND PISTON THEREFOR

TECHNICAL FIELD

The invention relates to an improved system for cooling a piston, and lubricating and cooling a connecting rod bushing and a piston pin contact surface.

BACKGROUND OF THE INVENTION

Reciprocating piston internal combustion engines include one or more pistons that are reciprocally disposed within corresponding combustion cylinders. The pistons are interconnected with each other through the use of a rotatable crankshaft. Rotation of the crankshaft causes each piston to reciprocate within its corresponding combustion cylinder. Typically, each piston is pivotally connected to one end of a connecting rod by a piston pin. The connecting rod includes a bore defining a bearing that receives a piston pin of the piston such that the connecting rod pivots through a relatively small pivoting angle about the piston pin during reciprocation. The other end of the connecting rod is also pivotally coupled to the crankshaft which also pivots through a relatively small angle. Lubrication of the moving and pivoting parts within an internal combustion engine is essential during operation, as the lubricant eases friction between moving/pivoting parts and aids in the removal of heat. The lubricant generally used is oil. Two areas where it is desired to provide lubrication and/or cooling in the internal combustion engine is the piston pin and the crown of a piston.

It is known to indirectly supply a lubricant such as oil to the piston pin by splashing the oil proximate to the piston pin area. In one form, oil that is sprayed onto the piston undercrown area specifically for cooling the piston crown which then splashes onto the piston pin bore of the connecting rod. Since the piston pin bore of the connecting rod is disposed about the piston pin, the oil wicks into the piston pin bore of the connecting rod bearing area defined between the piston pin and the connecting rod bore to provide lubrication. While the splash method does supply lubricant to the piston pin area, the amount of lubricant supplied to the piston pin by the splash method may not be satisfactory. Further, the splash method is a passive rather than an active or positive method of providing lubrication and cooling to the piston pin and thus is not preferable.

It is also known to supply lubricant to the piston pin via a hole drilled longitudinally through a corresponding connecting rod. The connecting rod bore is in fluid communication with a lubricant supply via the crankshaft. In this manner, pressurized lubricant may be provided to the piston pin resulting in a positive method of lubrication. However, the structural integrity of the connecting rod is compromised by the oil hole drilling in the connecting rod itself. Alternatively, if the connecting rod is enlarged to compensate for the oil hole drilling, thereby preserving the structural integrity of the connecting rod, weight and size for example, then become of particular concern. Moreover, this design results in an undesirable increase in manufacturing costs. Additionally, this method is prone to unacceptable oil leakage from the bearing on the crankshaft. Thus, providing an oil hole drilling in the connecting rod for supplying lubricant to the piston pin is not preferable.

To enhance cooling, well known oil cups or traps have been used to trap the oil as it drains downwardly and thereafter cause additional splashing as the piston reciprocates. For example, U.S. Pat. No. 4,286,505 to Amdall discloses a two-piece oil cooled piston including an annular groove in an upper crown portion of the piston and a trough-like fluid trap formed on the lower portion of the piston opposite the annular groove. The trap is formed in part by a ledge extending axially upwardly and outwardly toward the upper crown portion. The trap includes a slot for permitting the pressurized stream of oil from a nozzle to be directed past the ledge into the groove. When the piston is at bottom dead center, the spray from the nozzle enters and cools the annular groove. When the piston is at top dead center, the spray from the nozzle cools a cooling dome toward the center of the piston. This momentary cooling is advantageous but does not continuously cool both the annular groove and the dome.

U.S. Pat. No. 4,377,967 discloses a two-piece piston assembly including a piston-oil retention cup attached beneath the undersurface of the piston crown to hold oil directed to the crown by a nozzle to enhance cooling of the crown. The cup includes a grommet to permit the pressurized oil to be delivered through the cup to the crown.

U.S. Pat. No. 5,595,145 discloses a cooling structure for a piston including an annular cooling cavity in the upper portion of the piston for receiving sprayed oil from a nozzle. A distributing member is formed within the cooling cavity on the top wall surface of the cooling cavity downstream of the entrance to the cavity for splitting the spray into two streams of predetermined proportions. The two streams are directed into the cooling cavity in opposite directions.

U.S. Pat. No. 5,065,707 discloses an engine cooling system including a piston having a skirt with guide ribs for distributing sprayed oil to the piston pin, an upper portion of the piston connected to the skirt and a space between the skirt and the upper portion. The guide ribs are formed on the skirt and extend radially inwardly and upwardly toward the upper portion of the piston. U.S. Pat. No. 4,895,111 discloses a similar arrangement.

SUMMARY OF THE INVENTION

It is, therefore, one object of the present invention to overcome the deficiencies of the prior art and to provide a simple piston cooling arrangement for an internal combustion engine which effectively cools the piston and cools/lubricates the piston pin/connecting rod connection.

Another object of the present invention is to provide a piston cooling system and piston which effectively cools the piston crown and lubricates/cools the piston pin area using a single cooling nozzle.

Yet another object of the present invention is to provide a piston cooling system which effectively cools the piston crown and lubricates/cools the piston pin while minimizing the cost and design complexity of the engine.

Still another object of the present invention is to provide a piston with a closed gallery which is capable of effectively deflecting a flow of oil to ensure cooling of the piston crown and lubrication/cooling of the piston pin.

These and other objects are achieved by providing an internal combustion engine, comprising an engine body including an engine cylinder and a piston positionable in the engine cylinder including an upper crown portion, at least one depending support portion and a skirt. The upper crown portion includes an under surface and a cooling oil gallery formed in the under surface. The engine also includes a connecting rod, a piston pin extending through the depending support portion to connect the connecting rod to the piston and a cooling nozzle mounted on the engine to direct oil along a flow path toward the cooling gallery. The engine further includes a deflecting surface extending from one of either the upper crown portion or the skirt wherein the deflecting surface is positioned in the flow path of oil from the cooling nozzle to deflect the portion of the oil into a path toward the piston pin while permitting another portion of the oil flowing along the flow path to flow to the piston cooling oil gallery. The invention is also directed solely to the piston for connection to the connecting rod via the piston pin wherein the piston is positionable in an engine for cooling by oil flowing along the flow path from the cooling nozzle. In either case, the skirt may be formed integrally with the upper crown portion and a piston may include a bottom wall at least partially covering the cooling oil gallery. The piston may further include an inlet flow port formed in the bottom wall and positioned to permit oil flowing along the flow path to enter the cooling oil gallery. The deflecting surface may be designed so that the portion of oil flowing along the flow path onward to the cooling oil gallery is not deflected and therefore flows through an undeflected flow path directly to the oil gallery. Also, the bottom wall may be in the form of a cover plate mounted on the upper crown portion. In this case, the deflecting surface may be formed on a baffle formed by a portion of the cover plate and including a distal edge positioned in the flow path. The deflecting surface may extend outwardly toward an outer periphery of the piston and downwardly away from the upper crown portion. The deflecting surface may also be formed on a baffle formed integrally with the upper crown portion wherein the baffle includes a distal edge positioned in the flow path. The deflecting surface may extend at a predetermined angle, and include a predetermined deflecting surface area relative to an inlet flow area of the inlet flow port, to optimize the amount of oil deflected and the amount permitted to enter the cooling gallery to thereby ensure proper cooling of the upper crown portion and proper cooling and lubricating of the piston pin and connecting rod.

DETAILED DESCRIPTION OF THE INVENTION

Figure 1A:
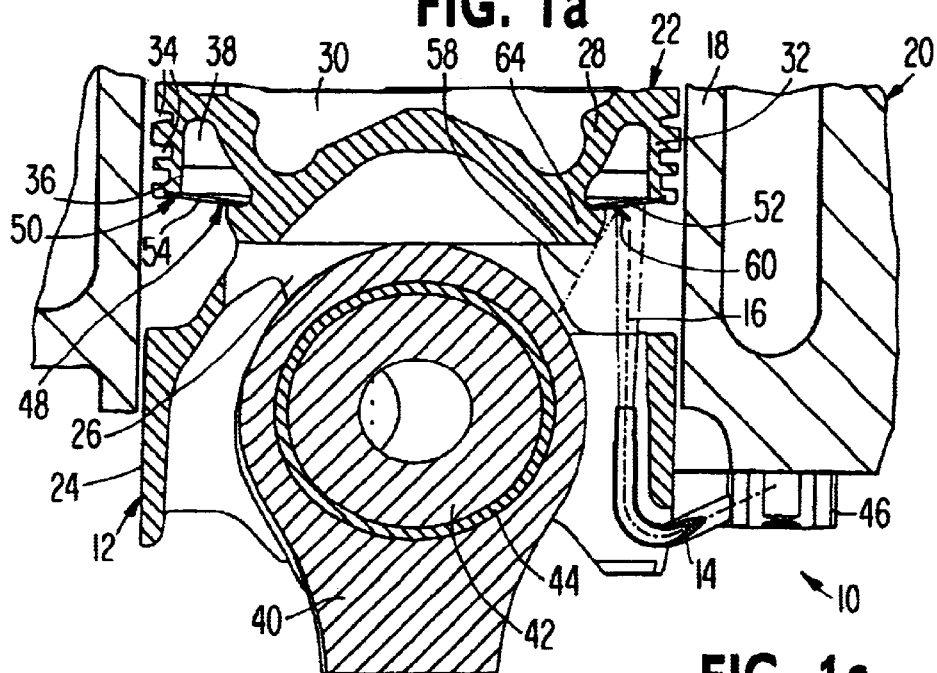
FIG. 1*a* is a cross sectional view of the piston and cooling nozzle of the piston cooling system of the present invention.
Figure 1C:
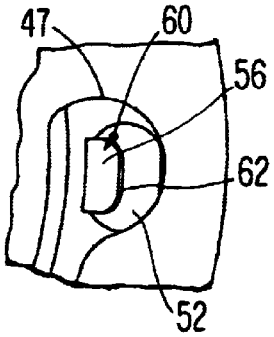
FIG. 1*c* is an enlarged view of the area surrounding the inlet flow port of the piston of FIG. 1*a*.
Figure 1B:
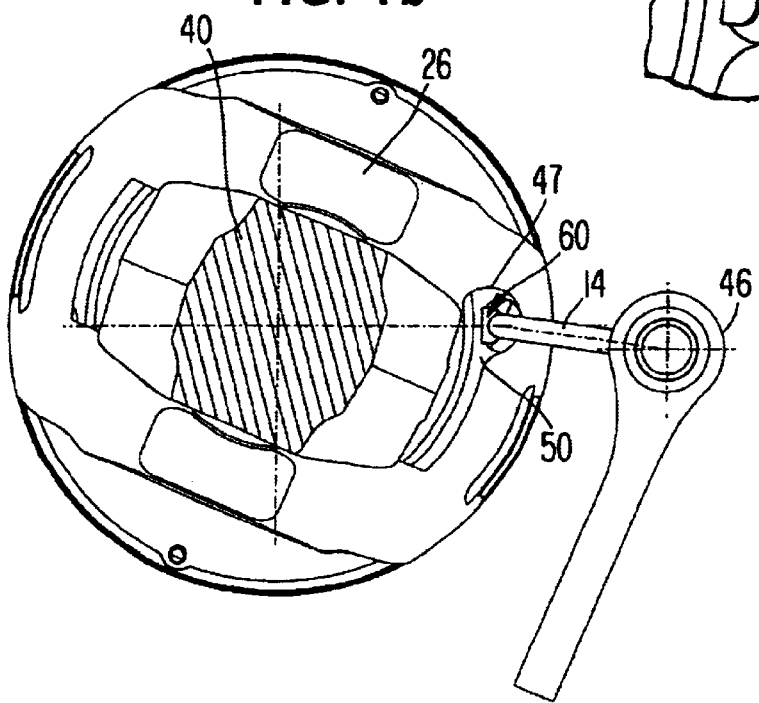
FIG. 1*b* is a bottom cross-sectional view taken along plane b—b in 1*a* but showing the entire piston.

Referring to FIGS. 1*a*–1*c*, there is shown the piston cooling system of the present invention, indicated generally at 10, including the piston of the present invention, indicated generally at 12, for use in an internal combustion engine, i.e. diesel engine. Piston cooling assembly 10 generally includes piston 12 and a cooling nozzle 14 mounted to spray a flow of cooling oil through a predetermined flow path 16 to a desired target location as discussed hereinbelow. Piston 12 is mounted within a cylinder liner 18 of an engine body 20. The engine may be any internal combustion engine having any number of engine cylinders so that one piston cooling system 10, including piston 12 and cooling nozzle 14, is associated with each cylinder of a multi-cylinder engine.

As shown in FIGS. 1*a* and 1*b*, piston 12 includes a piston body including an upper crown portion 22, a skirt 24 formed integrally with and depending from upper crown portion 22 and a depending support portion 26. Upper crown portion 22 includes an upper wall 28 having a combustion recess 30 formed therein and a peripheral depending outer wall 32. Depending outer wall 32 includes a series of outwardly facing piston ring grooves 34 for receiving piston rings (not shown). Upper crown portion 22 also includes an under surface 36 and a cooling gallery 38 preferably extending annularly around upper crown portion 22. Alternatively, skirt 24 may be connected to upper crown portion 22 by an articulated connection as is conventionally known.

The engine which includes piston cooling system 10 also includes a connecting rod 40 journaled to piston 12 in a suitable manner, such as, for example, with a piston pin 42 extending through apertures formed in the connecting rod 40 and apertures formed in depending support portion or portions 26. In the conventional manner, the opposite end of connecting rod 40 is attached to a crankshaft (not shown). A bushing 44 may be positioned between piston pin 42 and connecting rod 40 in a conventional manner to reduce wear and ensure a good fit.

Cooling nozzle 14 is mounted on a nozzle support 46 secured to the engine block. Specifically, the mounting of cooling nozzle 14 on the engine may be accomplished by any conventional means capable of securing the nozzle such as disclosed in U.S. Pat. No. 4,979,473 or U.S. Pat. No. 6,298,810, both of which are commonly assigned to the assignee of the present application and the entire contents of both are hereby incorporated by reference. Cooling nozzle 14 directs a pressurized flow of cooling oil, i.e. lubricating oil, through a predetermined flow path 16 to a particular targeted location to achieve optimal piston cooling and as discussed hereinbelow, optimal lubricating and cooling of connecting rod 40 and piston pin 42. As shown in FIG. 1*a*, piston 12 is positioned in its lowermost position, that is, bottom dead center, with the cooling nozzle entering the interior of skirt 24. Cooling nozzle 14 is installed and secured in a precisely aligned position relative to piston 12 to ensure the targeted area of the piston receives the sprayed oil as piston 12 reciprocates between the bottom dead center position and a top dead center position and then back again through its various strokes. The position of the piston adjacent skirt 24 includes a flow port 47 (FIG. 1*c*) for permitting the flow from nozzle 14 to flow through the piston body in a preferably unimpeded manner onward toward the gallery 38.

Piston 12 further includes a bottom wall 48 positioned to at least partially cover cooling gallery 38. Bottom wall 48 may be formed by a cover plate securely mounted on upper crown portion 22. In the embodiment shown in FIG. 1*a*, cover plate 50 extends from the lower edge of depending outer wall 32 radially inward to connect to an inner portion of upper crown portion 22 thereby substantially closing cooling gallery 38 to ensure oil entering cooling gallery 38 is temporarily directed through cooling gallery 38 and shaken during reciprocation of piston 12 to create an effective cooling process. Cover plate 50 extends annularly around cooling gallery 38 and includes an inlet flow port 52 for permitting cooling oil flowing through flow path 16 to enter cooling gallery 38. Cooling nozzle 14 is positioned to direct cooling oil through flow path 16 toward inlet flow port 52. Cover plate 50 also includes an outlet flow port 54 positioned on an opposite side of cooling gallery 38 for allowing the cooling oil flowing through cooling gallery 38 to exit thereby maintaining a continuous flow of cooling oil through cooling gallery 38. Of course, outlet flow port 54 may be positioned at a different location along cover plate 50, and additional outlet flow ports may be used.

Importantly, piston 12 of piston cooling system 10 also includes a deflecting surface 56 (FIG. 1c) positioned in flow path 16 for deflecting a portion of the oil flowing through flow path 16 into a deflected flow path, indicated generally at 58, toward the connecting rod and piston pin area as shown. Thus, the deflected oil flows over the connecting rod 40 and over the piston pin 42 providing a cooling effect and a lubrication effect as desired. In the embodiment shown in FIGS. 1a–1c, deflecting surface 56 is formed on a baffle 60 extending from cover plate 50. Preferably, baffle 60 is formed from the cover plate 50 and, specifically, by a stamping operation during the formation of inlet flow port 52. Thus, baffle 60 may be stamped or cut out and bent so as to extend into flow path 16. Baffle 60 is positioned such that deflecting surface 56 extends at an angle relative to the vertical flow path shown in FIG. 1a sufficient to cause the portion of oil contacting deflecting surface 56 to be deflected along deflected flow path 58 toward connecting rod 40 and piston pin 42. Baffle 60 includes a distal edge 62 terminating in the flow path 16. Therefore, deflecting surface 56 and baffle 60 extend outwardly toward an outer periphery of the piston and downwardly away from the upper crown portion as shown in FIG. 1a. Baffle 60 and deflecting surface 56 extend transversely only partially into the stream of cooling oil flowing along flow path 16 to deflect a portion of the oil while permitting the remaining portion to continue along flow path 16. Preferably, the portion of the oil which does not contact deflecting surface 56 continues on in an undeflected flow path through inlet flow port 52 into cooling gallery 38. It should be noted that cooling nozzle 14 is positioned relative to piston 12 such that throughout the reciprocation of piston 12, the targeted spray of cooling oil flowing through flow path 16 is precisely targeted such that a portion of the oil is deflected by baffle 60 while the remaining portion continues on into cooling gallery 38 via inlet flow port 52. However, in another embodiment, cooling nozzle 14 may be positioned relative to piston 12 such that a varying amount of cooling oil is deflected during reciprocation as the piston moves relative to the spray flow. That is, although a continuous amount of cooling oil is deflected, the amount varies throughout the reciprocation of the piston. It may also only be possible to position cooling nozzle 14 relative to piston 12 such that the cooling oil is directed against deflecting surface 56 of baffle 60 during only a portion of the piston stroke. Thus, deflecting surface 56 and baffle 60 are designed to deflect or reflect the flow of cooling oil so that the flow actually reverses direction into the deflected flow path 58. For example, the cooling oil may turn around approximately 110–160 degrees. It should also be noted that some other provision may be provided to deflect the undeflected portion of the cooling oil into inlet flow port 52, if desired. Also, a cutout may be formed in the lower portion of upper crown 22, for example, at 64, to ensure an unimpeded flow of deflected cooling oil through deflected flow path 58.

Figure 2A:
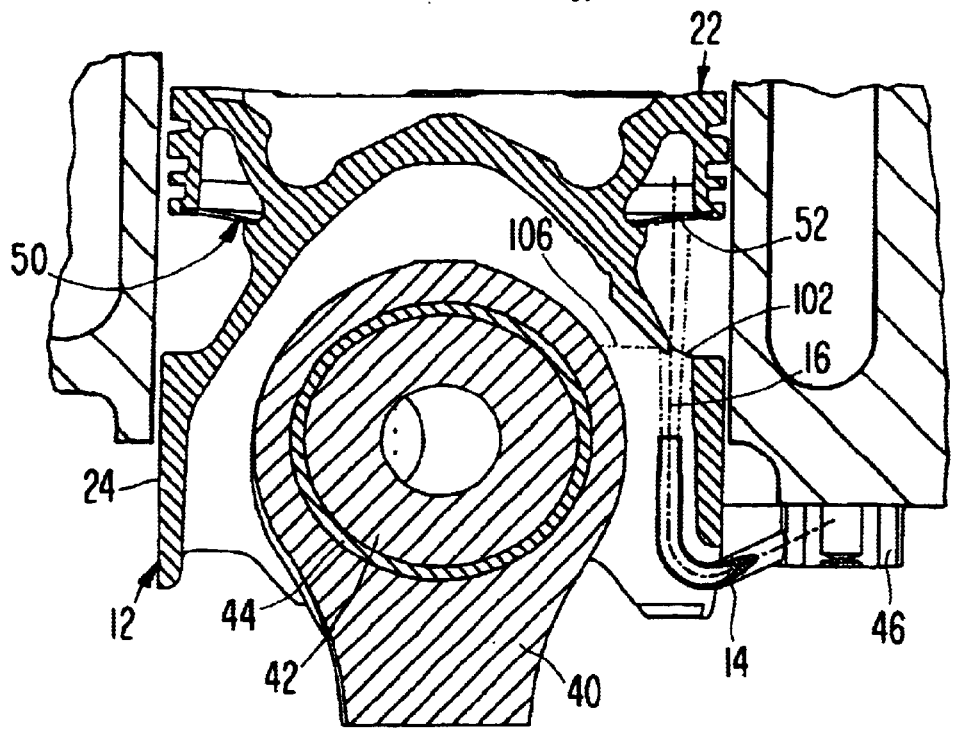
FIG. 2*a* is a cross sectional view of an embodiment of the piston and cooling nozzle of the piston of the present invention.
Figure 2B:
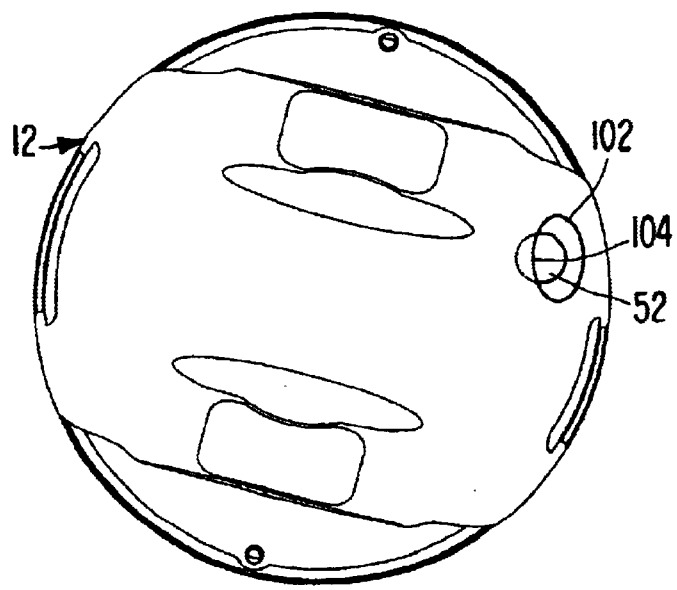
FIG. 2*b* is a bottom view of the piston of FIG. 2*a* without the connecting pin and rod.

FIGS. 2a and 2b illustrate a second embodiment of the present invention which is similar to the first embodiment and therefore the same reference numerals will be used to refer to the same or similar components. However, the embodiment of FIGS. 2a–2b includes a deflecting surface 100 integrally formed on the piston body, i.e. on the interior surface of the piston body. As shown in FIG. 2a, deflecting surface 100 is formed on the portion of the piston body connecting upper crown portion 22 to skirt 24. FIG. 2a is a closed skirt design unlike that shown in FIG. 1a so that a flow aperture 102 is formed in the portion of the piston body at the top of skirt 24 along flow path 16 in alignment with inlet flow port 52. Flow aperture 102 may be oval shaped as shown in FIG. 2b and slightly offset from circular inlet flow port 52. As a result, as shown in FIG. 2b, the inner edge 104 of flow aperture 102 functions as the distal edge of deflecting surface 100. Thus, the distal edge extends into flow path 16 allowing a portion of the targeted cooling oil to flow in an undeflected manner onward to intake flow port 52 while causing deflecting surface 100 to be positioned in the flow path 16 thereby deflecting a predetermined portion of the cooling oil toward the connecting rod and piston pin area. The deflected flow path 106 extends at approximately 90 degrees from the direction of flow path 16. However, any deflected angle may be appropriate so long as the path extends to directly intersect connecting rod and piston pin area.

As can be seen from both embodiments, the cooling oil flow is divided into an undeflected and a deflected flow wherein the ratio between the two flows is determined by the area ratio between the inlet flow port 52 and the reflecting/deflecting area of the deflecting surface positioned in flow path 16. Preferably, the majority of the flow will continue undeflected through the intake flow port 52 and into cooling gallery 38 to cool the upper crown portion 22. Thus, a minority of the cooling flow is preferably deflected to the connecting rod and piston pin area to cool and lubricate that joint thereby minimizing scuffing and wear at the connecting rod bushing and piston pin connection. In both embodiments the deflected flow path is a substantially linear or direct path intersecting the connecting rod and piston pin area, and not a flow path toward an area on the underside of the piston above the connecting rod, thereby providing more direct, accurate and consistent cooling oil flow. The present invention results in a very simple low cost design for effectively cooling and lubricating both the upper crown portion of the piston and the connecting rod and piston pin area while maintaining the cost effectiveness of a single cooling nozzle by avoiding the need for a second nozzle.

INDUSTRIAL APPLICABILITY

It is understood that the present invention is applicable to all reciprocating piston internal combustion engines. This invention is particularly applicable to diesel engines and specifically heavy duty diesel engines, used in truck and automotive vehicles as well as industrial applications, for example stationary power plants and others.

We claim:

1. An internal combustion engine, comprising:
an engine body including an engine cylinder;
a piston positionable in said engine cylinder, said piston including a piston body including an upper crown portion, at least one depending support portion and a skirt, said upper crown portion including an undersurface and a cooling oil gallery formed in said undersurface;
a connecting rod;
a piston pin extending through said at least one depending support portion to connect said connecting rod and said piston;
a cooling nozzle mounted on the engine to direct oil along a flow path toward said cooling gallery; and
a deflecting surface extending from one of said upper crown portion and said skirt, said deflecting surface positioned in said flow path of oil from said cooling nozzle to deflect a portion of the oil into a deflected flow path toward said piston pin while permitting another portion of the oil flowing along said flow path to flow to said cooling oil gallery, wherein said piston further includes a bottom wall at least partially covering said cooling oil gallery and an inlet flow port formed in said bottom wall, said inlet flow port positioned to permit oil flowing along said flow path to enter said cooling oil gallery, said bottom wall being a cover plate mounted on said upper crown portion, wherein said deflecting surface is formed on a baffle, said baffle formed by a portion of said cover plate and including a distal edge positioned in said flow path.

2. The engine of claim 1, wherein said skirt is formed integrally with said upper crown portion.

3. The engine of claim 1, wherein the another portion of oil proceeds in an undeflected flow path directly into said cooling oil gallery.

4. The engine of claim 1, wherein said deflecting surface extends outwardly toward an outer periphery of said piston and downwardly away from said upper crown portion.

5. The engine of claim 1, wherein said deflecting surface extends at a predetermined angle, and includes a predetermined deflecting surface area relative to an inlet flow area of said inlet flow port, to optimize the amount of oil deflected and the amount permitted to enter the cooling gallery to thereby ensure proper cooling of said upper crown portion and proper cooling and lubricating of the piston pin and connecting rod.

6. A piston for connection to a connecting rod via a piston pin and positionable in an internal combustion engine for cooling by oil flowing along a flow path from a cooling nozzle, comprising:

an upper crown portion including an undersurface and a cooling oil gallery formed in said undersurface;

at least one support portion depending from said upper crown portion;

a skirt;

a deflecting surface extending from one of said upper crown portion and said skirt, said deflecting surface positioned in said flow path of oil from said piston cooling nozzle to deflect a portion of the oil into a deflected flow path toward the piston pin and connecting rod while permitting another portion of the oil flowing along said flow path to flow to said cooling oil gallery, wherein said piston further includes a bottom wall at least partially covering said cooling oil gallery and an inlet flow port formed in said bottom wall, said inlet flow port positioned to permit oil flowing along said flow path to enter said cooling oil gallery, said bottom wall being a cover plate mounted on said upper crown portion, wherein said deflecting surface is formed on a baffle, said baffle formed by a portion of said cover plate and including a distal edge positioned in said flow path.

7. The piston of claim 6, wherein said skirt is formed integrally with said upper crown portion.

8. The piston of claim 6, wherein the another portion of oil proceeds in an undeflected flow path directly into said cooling oil gallery.

9. The piston of claim 6, wherein said deflecting surface extends outwardly toward an outer periphery of said piston and downwardly away from said upper crown portion.

10. The piston of claim 6, wherein said deflecting surface extends at a predetermined angle, and includes a predetermined deflecting surface area relative to an inlet flow area of said inlet flow port, to optimize the amount of oil deflected and the amount permitted to enter the cooling gallery to thereby ensure proper cooling of said upper crown portion and proper cooling and lubricating of the piston pin and connecting rod.

11. An internal combustion engine, comprising:

an engine body including an engine cylinder;

a piston positionable in said engine cylinder, said piston including a piston body including an upper crown portion, at least one depending support portion and a skirt, said upper crown portion including an undersurface and a cooling oil gallery formed in said undersurface;

a connecting rod;

a piston pin extending through said at least one depending support portion to connect said connecting rod and said piston;

a cooling nozzle mounted on the engine to direct oil along a flow path toward said cooling gallery; and a deflecting surface extending from one of said upper crown portion and said skirt, said deflecting surface positioned in said flow path of oil from said cooling nozzle to deflect a portion of the oil into a deflected flow path toward said piston pin while permitting another portion of the oil flowing along said flow path to flow to said cooling oil gallery;

wherein said deflecting surface is formed integrally on said piston body, said piston body forming said deflecting surface including a distal edge positioned in said flow path.

12. A piston for connection to a connecting rod via a piston pin and positionable in an internal combustion engine for cooling by oil flowing along a flow path from a cooling nozzle, comprising:

an upper crown portion including an undersurface and a cooling oil gallery formed in said undersurface;

at least one support portion depending from said upper crown portion;

a skirt;

a deflecting surface extending from one of said upper crown portion and said skirt, said deflecting surface positioned in said flow path of oil from said piston cooling nozzle to deflect a portion of the oil into a deflected flow path toward the piston pin and connecting rod while permitting another portion of the oil flowing along said flow path to flow to said cooling oil gallery;

wherein said deflecting surface is formed integrally on said piston body, said piston body forming said deflecting surface including a distal edge positioned in said flow path.

* * * * *